2,503,189

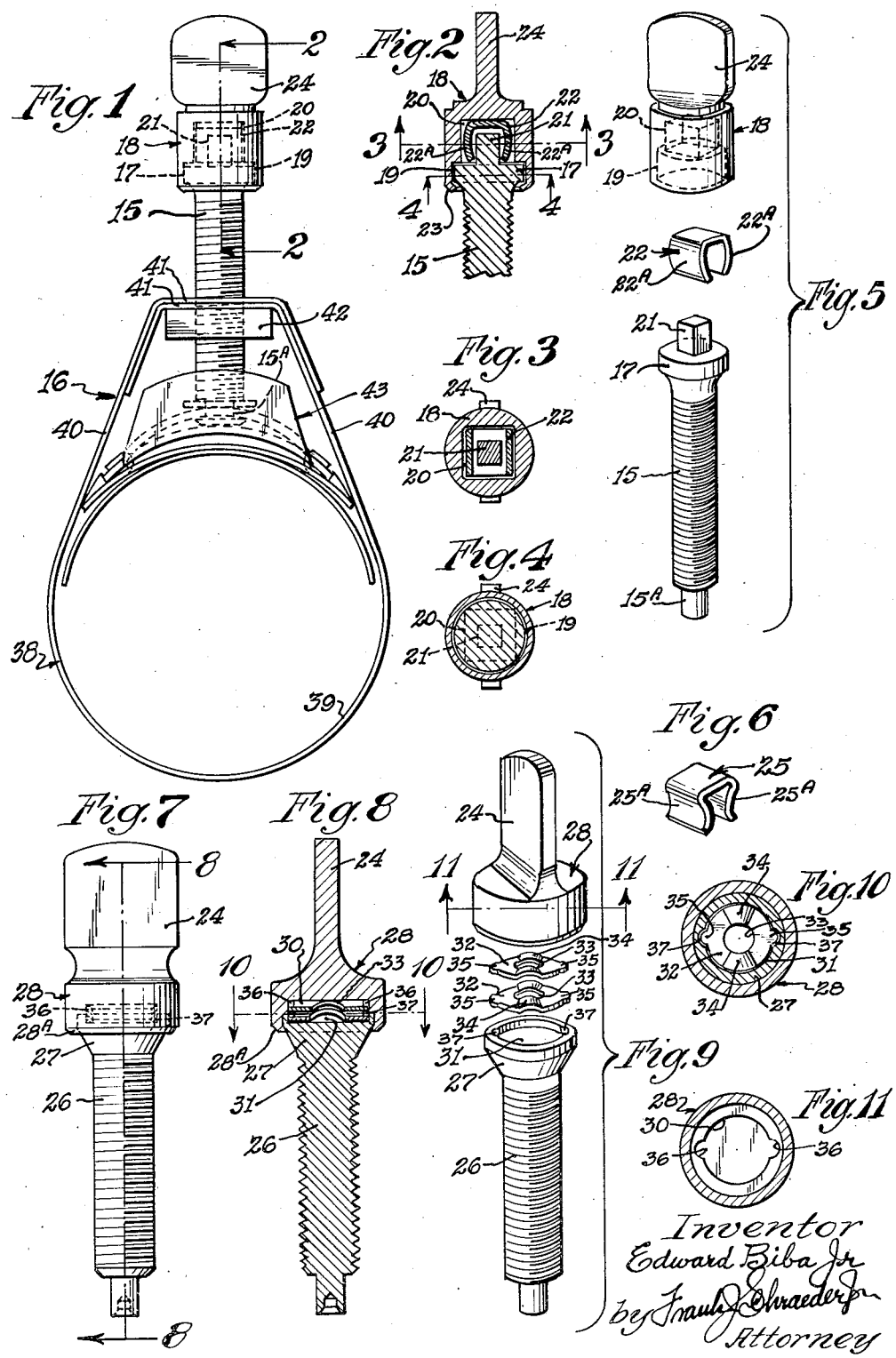
April 4, 1950     E. BIBA, JR     2,503,189
CLAMP TIGHTENER
Filed Jan. 14, 1946
Inventor
Edward Biba Jr.
by Frank Schraeder
Attorney Patented Apr. 4, 1950

UNITED STATES PATENT OFFICE 2,503,189

CLAMP TIGHTENER

Edward Biba, Jr., Cicero, Ill., assignor to Wittek Manufacturing Co., Chicago, Ill., a corporation of Illinois Application January 14, 1946, Serial No. 641,131

3 Claims. (Cl. 64—29)

This invention relates generally to clamp tighteners and has particular reference to an improved yieldable clutch-type tightening instrumentality.

There are various clamps, of the hose clamp type, wherein a rotatable element, usually a screw, in one way or another draws a flexible metal band tightly about the object which the clamp embraces or directly engages. When a wrench or the like is used to turn the screw in tightening the clamp, the clamp elements are frequently unduly stressed and the hose or other object gripped so forcibly as to cause damage to the tightening instrumentality or to the clamp band.

The object of the present invention is to provide simple, novel and effective means to overcome the hereinabove stated disadvantages and to prevent a clamp from exerting undue pressure on an object embraced thereby, while at all times permitting adequate tightening of the clamp.

In carrying out my invention, I provide the rotatable tightening member of a clamp with a part which is adapted to be engaged by a wrench or other tool and which acts as an integral part of the tightening member except when the resistance to turning offered by the latter passes a predetermined safe maximum. When this limit of safety is reached, the wrench-engaged part, which may be termed the actuator, automatically overruns the screw or other rotatable tightening member; the tightening member standing still and no further movement of the wrench in the direction to tighten the clamp having any effect on the same.

Viewed in one of its aspects, therefore, the present invention may be said to have for its object to provide a rotatable clamp tightening member with a simple, novel, and reliable actuator that prevents the turning of such member farther than required to produce the desired tightness of the clamp of which it forms a part.

The various features of novelty whereby the present invention is characterized will hereinafter be pointed out with particularity in the appended claims; but, for a full understanding of the invention and of its objects and advantages, reference may be had to the following detailed description taken in connection with the accompanying drawing, wherein:

Fig. 1 is an end view of a well known type of clamp, to the screw member of which the present invention has been applied;

Fig. 2 is a section on line 2—2 of Fig. 1;

Figs. 3 and 4 are sections taken, respectively, on lines 3—3 and 4—4 of Fig. 2;

Fig. 5 is a perspective view showing the three parts of the screw device separated from but in axial alignment with each other, ready for assembly;

Fig. 6 is a perspective view of a slighlty modified form of spring for use in the screw device;

Fig. 7 is an elevational view of a screw device in which the new features differ somewhat in construction from the corresponding parts in the preceding views;

Fig. 8 is a section on line 8—8 of Fig. 7;

Fig. 9 is a view similar to Fig. 5 illustrating the modified form of Figs. 7 and 8;

Fig. 10 is a section on line 10—10 of Fig. 8; and

Fig. 11 is a section on line 11—11 of Fig. 9.

Referring to Figs. 1–5 of the drawing, 15 represents any usual or suitable screw or other rotatable member for tightening a clamp; the clamp 16 shown in Fig. 1 being a well known type of hose clamp and being intended simply to be illustrative of clamps in general and consisting of essential elements, such as, the flexible band 38 having a circular medial portion 39 and substantially straight converging extensions 40 terminating in overlapped ends 41 secured to a nut 42 with which the tightening screw 15 has threaded engagement; the end 15$^A$ of the tightening screw 15 being rotatably connected with the bridge 43. There is a round enlargement or head 17 on the outer end of the screw. Fitted over this head 17 is a cap member 18 having in the lower end an open, cylindrical chamber 19 in which the head 17 on the screw is a rotatable fit. This chamber 19 is considerably deeper than the thickness of the head and opens into a smaller chamber 20, conveniently square in cross section, extending well up into the cap member 18 at the center thereof.

A little post 21, of square or other noncircular shape in cross section, fixed to and preferably integral with the head 17, rises from the center of the head 17 into chamber 20. The post 21 is not as long as the depth of chamber 20 and is also much smaller in cross sectional area so to leave a substantial clear space in the chamber around the post 21. Set on top of the screw head 17 is stiff spring element 22 in the shape of an inverted U that has its arms 22A positioned on opposite sides of the post 21.

The U-shaped spring element 22 is wider than the post 21 and sufficiently wide to be interlocked with the cap, in chamber 20, against relative rotary movements between the same and the cap. The arms of the U are bent so that each presses against the corresponding side of the post. In the arrangement shown, the arms are bowed and are closest together at their free ends.

After the spring 22 has been slipped on the post 21 and the cap 18 has been placed in position to enclose the head 12, post 21 and spring 22, the marginal portion at the lower end of the cap 18 is flanged or swaged inwardly, as indicated at 23, to fasten the cap 18 to the screw 15; the cap 18 being thus held against separation from the screw 15 although being rotatable thereon. The cap 18 may have at the top a thumb piece or part 24 adapted to be engaged by a wrench to turn the same.

The parts are so proportioned that the operative connection between the cap 18 and the screw 15 is, in effect, a rigid one as long as the screw does not offer more than the desired predetermined maximum resistance to turning with the cap. When the resistance exceeds such desired maximum value, the spring 22 and the post 21 become cooperating camming or slip clutch members functioning to spread the arms 22A of the spring far enough apart to enable the spring 22, and therefore the cap 18, to revolve about the post 21. So, in order to insure that the clamp shall never be tightened beyond a desired point or extent, the spring 22 need only be designed to yield and allow the cap 18 to overrun the screw 15 when such point is reached. The extent of the desired applied clamping pressure may be varied for different clamp uses by the use of springs varying in thickness and widths, hence, any desired maximum clamping pressure may be obtained by the use of proper width and thickness of spring material.

Instead of having the arms 22A of the spring bow oppositely outwardly at the middle as in the form just described, the curvature may be in the opposite direction. Thus, the spring 25, shown in Fig. 6, has its arms 25A closest together at the middle, or, at least, at some distance from their free ends.

In Figs. 7 to 11 inclusive there is shown a construction wherein both camming or clutch members that afford a yieldable driving connection between the cap and the screw are springs. In this form of the device, also, the screw 26 has a head, indicated at 27, over which a cap 28 is set; the marginal portion at the lower end of the cap 28 being swaged to produce an inwardly extending flange 28A that underlies the head 27. Chamber 30 in the cap 28, corresponding to chamber 19 in the other form, is shallow and registers with a similar, still shallower, chamber 31 in the top of the screw head 27. Within these registering chambers are two like discs of preferably spring metal or at least one of the discs being of spring metal. These discs are designated by the numeral 32 and are so deformed that, when they are laid one upon the other and turned relatively to each other, the portions in the normal planes thereof are caused to move away from each other. In the arrangement shown, each disc 32 has a central hole 33 and is crimped along a diameter to produce thereon two little radial trough-shaped protuberances 34 or up-set deformations spaced apart on opposite sides of the hole 33. Each disc also has, at two diametrically opposed points, little ears 35 projecting from the edge in the plane thereof. Each of the walls surrounding chambers 30 and 31 contains a pair of diametrically opposed notches 36, 36 and 37, 37, respectively, in which the ears on the corresponding disc are seated. Thus one disc 32 is interlocked with the screw head 27 and the other with the cap 28, each disc 32 being held against rotation relative to the element with which it is so interlocked.

The chamber 31 in the screw head 27 has a depth which is preferably only slightly deeper than the thickness of the disc therein, however, the chamber 30 in the cap 28 is of sufficient depth to have its inner flat circular wall in engagement with the protuberances 34 of the disc therein.

Normally, during tightening of the screw 26, the pairs of protuberances 34 of the two discs 32 are nested together and because one of the discs has its opposed ears 35 within the notches or seats 36 of the cap 28 and the other disc has its ears 35 within the notches or seats 36 of the cap 28 and the other disc has its ears 35 within the notches or seats 37 of screw head 27, the discs rotate together and with the members in which they are so seated and through the interlocking operative connection established by the interlocked nested protuberances 34 a rotation of the cap 28, by a wrench or suitable tool, is transmitted to the screw 26.

The discs and their nested protuberances are so proportioned that the operative connection between the cap 28 and the screw 26 is, in effect, a rigid one as long as the screw 26 does not offer more than the desired resistance to turning with the cap 28. When the resistance exceeds such desired maximum value, the protuberances 34 will be automatically displaced from their nested positions so that the cap 28 will overrun the screw 26 because the disc within the cap 28, because of its resiliency, will slidably rotate over the disc seated in the screwhead 27.

The combined depths of chambers 30 and 31 is such that when the discs are within the same, in nested relation to each other, they touch both the floor and the ceiling of the composite chamber. Then, when a tool is applied to the cap to turn the same, the screw is driven through the medium of the nested protuberances on the discs. These protuberances act as cams, those on one disc that are seated in the troughs of the protuberances on the other tending to push themselves out of such troughs as soon as the screw begins to offer resistance to the effort of the cap to turn it. When such resistance reaches the safe point in the tightening of the clamp, the pressure on the protuberances become so great that a deformation of the discs sufficient to permit the protuberances on one to snap past those on the other occurs; the screw thereafter remaining stationary even though the cap should continue to be turned.

It will thus be seen that I have provided a very simple means for positively guarding against damage through the application of too great a force in the tightening of a clamp wherein the tightening is done by a rotating element, usually a screw.

While I have described with particularity the various features of my invention embodied in the illustrations in the drawing, I do not desire to be understood as limiting myself to the precise details thus illustrated and described, but intend to cover all forms and arrangements that come within the definitions of my invention constituting the appended claims.

The invention is shown and described for illustrative purposes as applied to a hose clamp tightening screw but it is obvious that my invention may be readily applied to other tightening elements or devices such as screws for securing various members other than a clamp band.

I claim:

1. A tightening instrumentality including a screw having at one end a head; a wrench-engageable cap; means providing interengagement of said cap with said head permitting rotation of said cap relatively to said head but preventing displacement of said cap from said head; two cooperating clutch members, one of said clutch members being a post on said head, non-circular in cross-section and smaller in cross-sectional area than the interior of said cap, the other clutch member being a U-shaped spring that rotates with said cap and has curved arms engaged with opposite sides of and gripping the post at points in the arms which are normally closest together, said spring permitting relative turning movements between the screw and the cap when the resistance offered by the screw to turning exceeds a predetermined value.

2. A tightening instrumentality including a screw having at one end a head; a wrench-engageable cap; means providing interengagement of said cap with said head permitting rotation of said cap relatively to said head but preventing axial displacement of said cap from said head; two cooperaitng clutch members, one of said clutch members being a post of non-circular cross-section on said head and the other of said clutch members being a U-shaped spring within said cap that normally in tightening operation rotates with said cap and has oppositely outwardly bowed arms the free ends of which engage with opposite sides of said post, said spring permitting relative turning movements between the screw and the cap when the resistance offered by the screw to turning exceeds a predetermined value.

3. A tightening instrumentality including a screw having at one end a head; a wrench-engageable cap; means providing interengagement of said cap with said head permitting rotation of said cap relatively to said head but preventing axial displacement of said cap from said head; two cooperating clutch members, one of said clutch members being a post of non-circular cross-section on said head and the other of said clutch members being a U-shaped spring within said cap that normally in tightening operation rotates with said cap and has oppositely inwardly bowed arms which are closest together at their medial portions whereat they engage with opposite sides of said post, said spring permitting relative turning movements between the screw and the cap when the resistance offered by the screw to turning exceeds a predetermined value.

EDWARD BIBA, JR.

REFERENCES CITED

The following references are of record in the file of this patent:

UNITED STATES PATENTS

| Number | Name | Date |
| --- | --- | --- |
| 1,468,322 | Odom | Sept. 18, 1923 |
| 2,409,545 | Cornwell | Oct. 15, 1946 |

FOREIGN PATENTS

| Number | Country | Date |
| --- | --- | --- |
| 749,550 | France | 1933 |